United States Patent [19]

Storberg

[11] Patent Number: 4,860,311
[45] Date of Patent: Aug. 22, 1989

[54] METHOD AND APPARATUS FOR AUTOMATICALLY CONVERTING INPUT PULSE TRAIN SIGNALS TO OUTPUT SIGNALS OF DESIRED POLARITY

[75] Inventor: David G. Storberg, Lino Lakes, Minn.

[73] Assignee: CPT Corporation, Eden Prairie, Minn.

[21] Appl. No.: 45,033

[22] Filed: May 1, 1987

[51] Int. Cl.⁴ .......................................... H04L 25/34
[52] U.S. Cl. ..................................... 375/19; 307/262; 361/246
[58] Field of Search ................... 375/19, 36; 361/245, 361/246; 307/262; 178/66.1, 67.1, 69 D

[56] References Cited

U.S. PATENT DOCUMENTS

| | | | |
|---|---|---|---|
| 3,193,769 | 7/1965 | Graham et al. | 328/133 |
| 3,510,688 | 5/1970 | Andersson et al. | 307/235 |
| 3,541,355 | 11/1970 | Kan | 307/262 |
| 3,558,998 | 5/1968 | Bertolasi | 361/245 |
| 3,624,414 | 11/1971 | Van Dijk | 307/229 |
| 3,781,605 | 12/1973 | Emerson | 317/5 |
| 3,823,271 | 7/1974 | Carbrey | 307/262 |
| 3,849,607 | 11/1974 | Carbrey | 307/262 |
| 4,053,797 | 10/1977 | Tosuntikool et al. | 307/262 |
| 4,176,248 | 11/1979 | Sheets | 361/246 |
| 4,259,686 | 3/1981 | Suzuki et al. | 307/262 |
| 4,277,699 | 7/1981 | Brown et al. | 307/272 R |
| 4,420,786 | 12/1983 | Toney | 361/246 |
| 4,468,752 | 8/1984 | Chatham | 364/900 |

FOREIGN PATENT DOCUMENTS

| | | | |
|---|---|---|---|
| 0010525 | 1/1982 | Japan | 307/262 |
| 0003418 | 1/1983 | Japan | 307/262 |

OTHER PUBLICATIONS

"CPT Schematic", (drawing of circuit).

Primary Examiner—Robert L. Griffin
Assistant Examiner—Stephen Chin
Attorney, Agent, or Firm—Merchant, Gould, Smith, Edell, Welter & Schmidt

[57] ABSTRACT

A method and apparatus for sensing the polarity of an input pulse train signal and for automatically changing its polarity as required by the circuit to which it will be applied, is disclosed. The polarity of the input pulse train signal is determined by an averaging network that detects the average DC level of the signal. The averaged signal is compared with one representing the desired output signal polarity to provide a control signal which is used to determine whether the input signal is of the proper polarity to form the output signal or whether it must first be inverted. The phase and timing parameters of the output pulse train signal match those of the input signal.

9 Claims, 3 Drawing Sheets

METHOD AND APPARATUS FOR AUTOMATICALLY CONVERTING INPUT PULSE TRAIN SIGNALS TO OUTPUT SIGNALS OF DESIRED POLARITY

FIELD OF THE INVENTION

This invention relates generally to electrical signal processing circuitry, and more particularly to a circuit for automatically sensing the polarity of an incoming pulse train signal and for converting it to an output signal of the proper polarity as required by an ultimate receiving circuit.

BACKGROUND OF THE INVENTION

Since the invention of transistors, digital control circuits have revolutionized not only the electronics industry, but all walks of life which use or depend upon an electronic switching function for control and/or operation of an electrical circuit. The transistor, in digital applications, basically operates as an "on/off" switch. This is in contrast to analogue circuits which operate on the basic principles of measuring and multiplying the actual real-time value of electrical signals.

The present invention applies to digital, as opposed to analogue circuitry. Such digital circuits typically operate in response to series or combinations of "binary" or "logical" signal levels. While the digital signals may assume a plurality of different levels or operative states, for simplicity, most digital systems operate on a simple "two-level" or "binary" logical system. Simply stated, the digital signal assumes either a "logical one" or a "logical zero" state or level.

The actual pulse train used to implement the desired logical signal can be configured using either what is typically referred to as "positive" or "negative" logic. Positive logic refers to that condition which exists when the voltage that is used to represent a "logical one" signal is greater than that voltage level that is used to represent a "logical zero" signal. The "base" voltage (i.e. the "logical zero" voltage value) can be set at any desired voltage level, as dictated by the particular components used to implement the digital circuitry. For example, while it is common to set the base or reference level for a "logical zero" at ground or zero volts in a "positive logic" system, the base or reference voltage could be set at any other desired reference level. In contrast, "negative logic" refers to that condition which exists when the voltage level that is used to represent a "logical one" signal is less than that voltage level that is used to represent a "logical zero" signal. The characterization of a circuit as being operative in response to either "positive" or "negative" logical signals is typically referred to as the "polarity" of the circuit, and the circuit is typically referred to as operating simply on either "positive logic" or "negative logic".

Any given digital circuit necessarily operates either on a "positive" or "negative" logic basis, and requires any input signal received from outside of the circuit to be compatible with that "type" of logic on which the circuit has been designed to operate. Obviously, the application of a negative logic input signal to a positive logic digital network, would not produce the desired results from the digital network. The same would be true for application of positive logic input signals to a negative logic digital network. For this reason, electronic circuits designed to receive external input signals, are accompanied by instructions or schematic diagrams which allow the user of the circuit to apply input pulses of the proper polarity to the circuitry. It is customary for a user of the circuit to: (1) determine the circuit polarity and (2) assure that the input signals applied to such circuit are of the proper polarity, either by selecting equipment for providing input signals of the proper polarity, or by converting the input signals to the desired polarity before applying them to the circuit network.

There are many applications in the electronics industry, particularly where modular equipment is being used, wherein it is desirable to interchangeably connect a piece of electronic equipment to receive input signals from any one of a number of electronic modules, without having to take the time to determine the "polarity" of the incoming signals from the respective modules, and without having to make the decision as to whether such incoming signals are compatible with the receiving network. An example of one such situation is in the computer and word processing industries, wherein CRT consoles or monitors manufactured by one supplier may be used with control and/or drive equipment of many different manufacturers. In such an instance, it is desirable for the end user to simply. connect the CRT console to receive the output signals from the related drive modules, without having to take the time and precautions for determining the polarity compatibility of the drive module circuitry with that of the CRT console. Further, such polarity incompatibility dilemma is repeated each time the user disconnects the CRT console from one module for operation by another. As simple as it may seem, circuits have not been provided in the art for determining the polarity of the incoming signal and for "automatically" passing such signal as is, or for converting its polarity if required, to match that polarity needed by the receiving circuit.

The present invention directly addresses and solves the shortcomings of the prior art and eliminates the manual efforts involved in determining the compatibility status of an incoming signal with the requirements of the receiving circuit and for automatically making any required changes in the receiving signal to accomplish compatibility.

SUMMARY OF THE INVENTION

The present invention provides a simple, relatively inexpensive, and yet reliable method and apparatus for automatically, continuously sensing the polarity of an incoming pulse train signal and for converting it whenever required, to an output pulse train signal having the desired polarity, while retaining the timing characteristics of the input signal.

The input pulse train signal is applied to a level detector network which provides an output signal indicative of the average DC level of the input pulse train. Assuming that the input signal is not a Squarewave signal, but represents a pulse train signal having a duty cycle significantly less than 50% (such as would be the case for typical synchronization timing pulse train signals), the input pulse train signal will have an average DC value that reflects the logic "polarity" of the input signal. For any given type of logical network components (such as CMOS, TTL, etc.), the characteristic averaged voltage level of a pulse train signal generated by such logic type will be readily identifiable with an input pulse train signal of "positive" or "negative" polarity. Such "averaged" signal is compared with a reference signal having a voltage level indicative of the desired output "polarity" of the output pulse train signal. A control signal is produced in response to the comparison of the averaged input pulse train signal and the reference signal, which determines whether the input pulse train signal will be directly passed to the output terminal of the network or whether it must first be inverted. The control signal and the input pulse train signal are according to a preferred configuration of the invention, processed by a logic gate which either: (1) passes the received input pulse train signal to the output terminal of the network unchanged if its polarity corresponds to the desired output signal polarity; or (2) inverts the polarity of the input pulse train signal if the averaging circuit determination indicates that the polarity of the input pulse train signal is opposite to the desired polarity of the output signal.

Therefore, according to one aspect of the invention, there is provided a method of automatically converting a received pulse train signal into an output pulse train signal of desired polarity regardless of the changing polarity characteristics of the input pulse train signal, comprising:

(a) receiving an input pulse train signal;

(b) determining the average polarity of the input pulse train signal and providing a detected output signal indicative of such average polarity;

(c) establishing a first reference signal which represents the desired polarity of the output pulse train signal;

(d) forming a control signal in response to the first reference signal and the detected output signal which indicates whether the polarity of the input pulse train signal is to be inverted; and (e) conditioning the polarity of the input pulse train signal in response to the control signal to produce an output pulse train signal of desired polarity while retaining the timing characteristics of the input pulse train signal.

According to a further aspect of the invention, there is provided a method as recited above which is operative to automatically condition any received input pulse train signal to provide an output pulse train signal of positive polarity. According to another aspect of the invention, there is provided a method for receiving pulse train signals of either polarity and for automatically providing an output pulse train signal therefrom having negative polarity.

According to another aspect of the invention, there is provided an apparatus for automatically converting an input pulse train signal to an output pulse train signal of desired polarity regardless of the changing polarity characteristics of the input pulse train signal, comprising:

(a) signal averaging means operatively connected to receive an input pulse train signal for creating a detected output signal responsive to its average DC level;

(b) means for establishing a polarity indicator signal indicative of the desired polarity of the output pulse train signal;

(c) means operatively connected to receive the detected output signal and the polarity indicator signal for providing a control signal which represents the comparison of the two signals; and (d) logic means operatively connected to receive the input pulse train signal and the control signal for changing the instantaneous value of the input pulse train signal as dictated by the control signal so as to cause the input pulse train signal to assume the desired polarity at the output terminal of the network.

While the invention will be described with respect to a preferred embodiment circuit configuration and with respect to particular circuit components used therein, it will be understood that the invention is not to be construed as limited in any manner by either such circuit configurations or circuit components described herein. Also, while the particular types (i.e. such as CMOS-type) circuit components will be described with respect to the description of a preferred embodiment of the invention, it will be understood that such particular circuit types are not to be construed in a limiting manner. Further, while the preferred embodiment of the invention will be described in relation to a network and method as applicable to the processing of input signals to a CRT console or monitor, it will be understood that the scope of the invention is not to be limited in any way by the circuit or network environment in which it is employed. The principles of this invention apply to the automatic processing of pulse train signals so as to automatically provide the proper polarity therefor, for subsequent use by any type of electronic equipment requiring an input pulse train signal of a desired polarity. These and other variations of the invention will become apparent to those skilled in the art upon a more detailed description of the invention.

These and various other advantages and features which characterize the invention are pointed out with particularity in the claims annexed hereto and forming a part hereof. However, for a better understanding of the invention, its advantages and objectives obtained by its use, reference should be had to the Drawing which forms a further part hereof and to the accompanying descriptive matter, in which there is illustrated and described a preferred embodiment of the invention.

BRIEF DESCRIPTION OF THE DRAWING

Referring to the Drawing, wherein like numerals represent like parts throughout the several views.

DETAILED DESCRIPTION OF THE PREFERRED EMBODIMENT

As mentioned above, the principles of this invention apply to the automatic conversion of pulse train signals of the type having a determinable logic "polarity", to the appropriate polarity required by a subsequent user circuit. This invention provides an interface network for automatically ensuring that the polarity of an input pulse train signal applied to a circuit module or component is of the proper polarity required by such module. A preferred application for this invention is in the monitoring and processing of pulse train signals applied to the input synchronization ports of a CRT terminal or console as used, for example, in data processing or word processing applications. Such application is typical of only one of innumerable types of applications in which the principles of the present invention can be employed.

In the preferred application of the invention, a typical input pulse train signal for the "horizontal" synchronization input signal to a monitor may be on the order of 64 khz, with individual pulse widths on the order of 2 microsec. On the other hand, the vertical synchronization input signal may have a typical frequency of 78 hz with a typical pulse width on the order of 600 microsec. As will become apparent upon a more detailed description of the preferred embodiment of the invention, the method and apparatus of this invention can be employed to accommodate input signals of any frequency and polarity, are typically dictated by the input requirements of the network receiving the signals. The above frequencies and the application of this invention to the monitoring and processing of horizontal and vertical synchronization signals for a CRT monitor are not in any way to be construed in a limiting manner.

Figure 1:
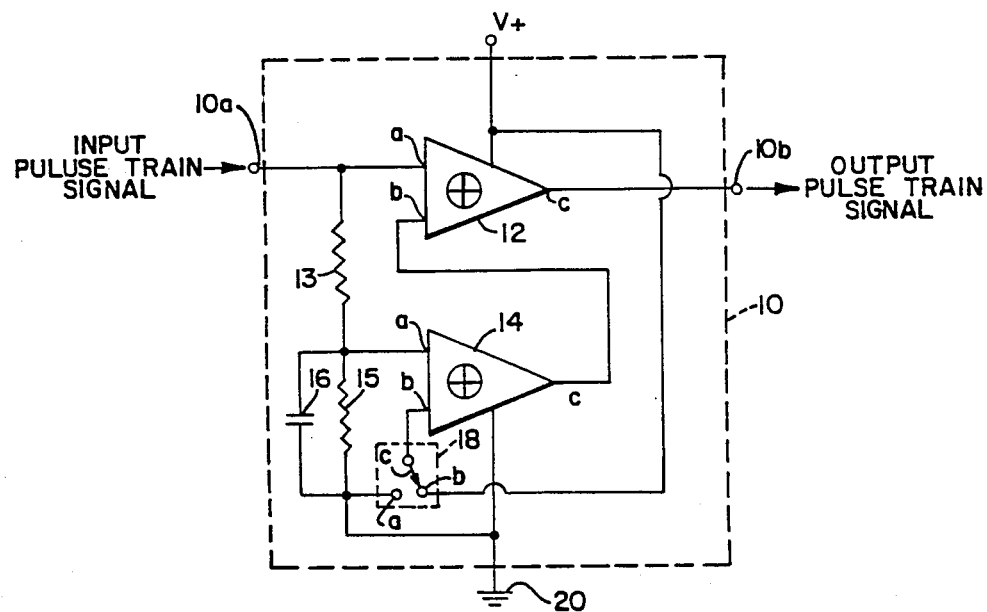
FIG. 1 is a schematic diagram of a preferred circuit configuration that practices the principles of this invention.

Referring to FIG. 1, there is illustrated a preferred circuit configuration which practices and implements the present invention. Referring thereto, there is illustrated at 10 an automatic conversion circuit for monitoring an input pulse train signal received at its input terminal 10a and for providing the monitored input signal to its output terminal 10b with the desired polarity characteristics, as hereinafter described in more detail. The network 10 includes a pair of Exclusive OR logical gates 12 and 14 which in the preferred embodiment form two gates of a CMOS quad Exclusive OR package commonly sold under the 74HCT86 designation, which is characterized by high input impedance and which requires relatively low supply potentials. For simplicity hereinafter the Exclusive OR gates will simply be referred to as "gates". It will be appreciated by those skilled in the art that other types of circuit networks such as TTL components or even other types of CMOS components could equally well be used to implement the present invention, with appropriate changes in the values and perhaps even types of peripheral components used therewith.

While not specifically detailed in FIG. 1, it will be understood that the gates 12 and 14 are properly connected to appropriate bias and reference supplies so as to operate in their intended manner. For simplicity, the gate 12 is illustrated as being connected to an appropriate V+ bias supply (which is in the preferred embodiment a +5 volt supply), and the gate 14 is illustrated as being connected to an appropriate reference terminal, generally designated at 20. The input pulse train signal applied by means of the input terminal 10a is directly applied to a first input terminal 12a of the gate 12 and is applied by means of a resistor 13 to a first input terminal 14a of the gate 14. The input signal is also carried by means of the resistor 13 and a parallel combination of a resistor 15 and a capacitor 16 to the reference bus 20 and to a first stationary contact 18a of a selector switch 18. Switch 18 further has a second stationary contact 18b which is connected to the V+ supply, and a movable wiper element 18c which is connected to the second input terminal 14b of the gate 14. The signal output of gate 14 is directly connected to the second input terminal 12b of the gate 12. Signal output of gate 12 is connected to the output terminal 10b of the network and provides the output pulse train signal therefor.

In a preferred embodiment of the invention, as applicable to the processing of the horizontal and vertical synchronization signals for a CRT monitor having signal frequencies of 64 khz and 78 hz respectively, the typical values for resistors 13 and 15 are 27 kohms and 82 kohms respectively. The value of the capacitor 16 is in the preferred embodiment, selected at 0.1 microfarad for processing of the 64 khz signal and at 10 microfarads for processing of the 78 hz signal. It will readily be appreciated by those skilled in the art that these values are simply a matter of design choice to accomplish the input signal averaging function as hereinafter described, and can readily be changed and varied by those skilled in the art.

The selector switch 18 is used to preselect the desired logical polarity of the output pulse train signal provided to the output terminal 10b of the network. In the preferred embodiment network 10, when the movable wiper arm 18c of switch 18 is placed in contact with the first stationary contact 18a, the reference potential (i.e. a logical "low" signal) will be provided to the second input terminal 14b of gate 14. Conversely, when the movable wiper arm 18c of switch 18 is in operative engagement with the second stationary contact 18b of the switch, the positive bias supply V+ (i.e. a logical "high" signal) will be applied to the second input terminal 14b of gate. As will become apparent upon a more detailed description of the invention, when the switch is at its 18a position, the output signal delivered by gate 12 to the output terminal 12b will automatically assume a "positive logic" condition. Conversely, when the switch is engaged in its 18b position, the output pulse train signal applied by gate 12 to the output terminal 10b of the network will automatically assume a "negative logic" condition.

The resistors 15 and 13 and the capacitor 16 are selected so as to provide a charging time constant for capacitor 16 which tends to average the input pulse train signal applied to the input terminal 10a and which is sufficiently large such that a single input pulse of the pulse train signal will not enable full charge or discharge of capacitor 16. Further, the value of resistor 15 is selected such that the charge level of capacitor 16 can be dissipated therethrough in the time interval between successive pulses of the input pulse train signal. Accordingly, the voltage level applied to the first input terminal 14a of gate 14 will always assume the "resting state" or average DC level of the input signal. As long as the "polarity" of the input pulse train signal remains the same, for any given switch selection of switch, the signal output of gate 14 will remain constant, as dictated by the logical input/output truth table for gate 14.

Figure 2A:
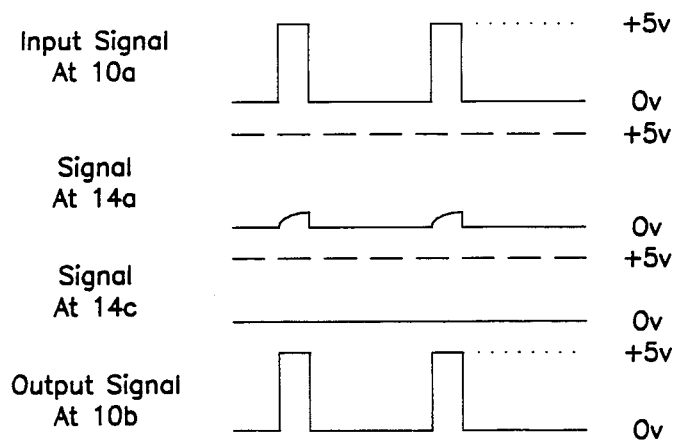
FIG. 2A and 2B are graphical illustration of the signal representations appearing at various nodes of the circuit of FIG. 1, when operative to provide a "positive" logic output pulse train signal.

For example, if an input pulse train signal having "positive" polarity is applied to the input terminal 10a, the average, "resting state" value of the input pulse train signal appears at a logical "low" level. The logical "low" portion of the signal will cause a logical "low" input signal to be applied to the input terminal 14a of gate 14. If a "positive logic" output signal is desired from the network 10, the switch 18 will be operated so as to engage its movable wiper arm with the terminal 18a thereof, so as to also provide a logical "low" input signal to the second input terminal 14b of gate 14. Such two logical low input signals to gate 14 will cause a logical "low" signal to be applied to the second input terminal 12b of gate 12. When the first positive going (i.e. logical "high") pulse of the input signal appears at terminal 10a, the positive signal will be applied through resistor 13 to begin charging capacitor 16. However, due to the relatively long time constant associated with capacitor 16 and resistor 15, the charging level of capacitor 16 will never attain a sufficient threshold level during the width of the input pulse applied to terminal 10a so as to provide a logical "high" signal to terminal 14a of gate 14. Accordingly, under such conditions, the output of gate 14 will always remain at a logical "low" level, permitting the output of gate 12 to follow the signal applied at its 12a input terminal, so as to provide an output pulse train signal at output terminal 12b which is a "positive logic" signal. This condition is graphically illustrated in FIG. 2A wherein it can be seen that the output signal at terminal 10b identically tracks the pulse train signal applied to input terminal 10a.

Figure 2B:
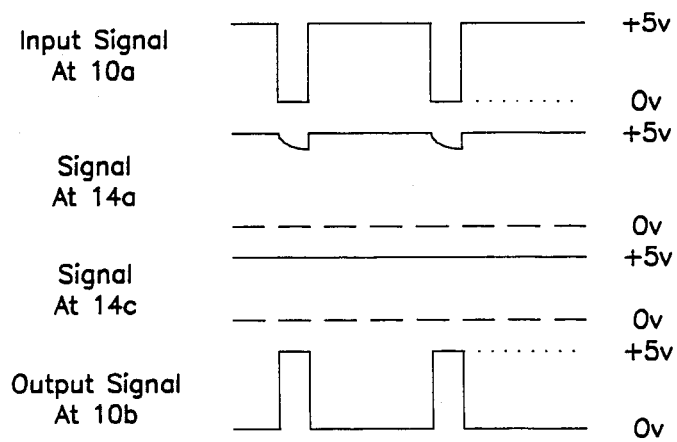

If switch 18 is selected so as to provide a positive logic output signal (i.e. with wiper arm 18c in engagement with terminal 18a), the following situation will occur if a negative logic input signal is received at input terminal 10a. When the resting state voltage is applied to the input terminal, the voltage level of the resting state will fully charge capacitor 16, providing a logical "high" signal to input terminal 14a of gate 14. The switch 18 will simultaneously provide a logical "low" signal to input terminal 14b, causing gate 14 to provide a logical "high" signal to input terminal 12b of gate 12. The two logical "high" input signals applied to gate 12 will cause its output signal to assume a logical "low" level. When the first negative going (i.e. logical "low") pulse is applied to the input terminal 10a, capacitor 16 will begin discharging through resistors 13 and 15. However, the time constant associated with such discharge when selected to be sufficiently large, will not allow capacitor 16 to discharge to such a level so as to provide a logical "low" input signal to terminal 14a of gate 14. Accordingly, gate 14 will continue to maintain a logical "high" input signal to the 12b input terminal of gate 12. Application of the negative going pulse to terminal 12a, when coupled with the logical "high" signal at its 12b terminal, will cause the output of gate 12 to switch to a logical "high" level for the duration of the pulse—providing a positive logic signal output at terminal 10b of network 10 which is the inverted input signal being applied to the input terminal 10a, but which also has the same frequency and phase characteristics of the input signal. This condition is graphically illustrated in FIG. 2B, wherein the signal appearing at the output terminal 10b of network 10 is illustrated as the positive logic equivalent of the negative logic input pulse train signal applied to the input terminal 10a of network 10.

Figure 3A:
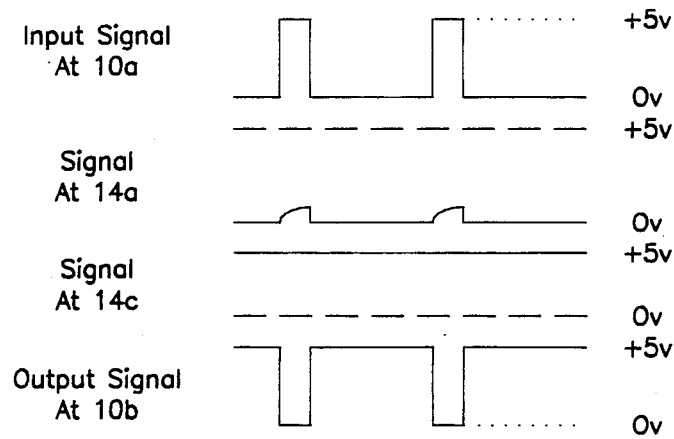
FIGS. 3A and 3B are graphical illustration of the signal representations appearing at various nodes of the circuit of FIG. 1, when operative to provide a "negative" logic output pulse train signal.
Figure 3B:
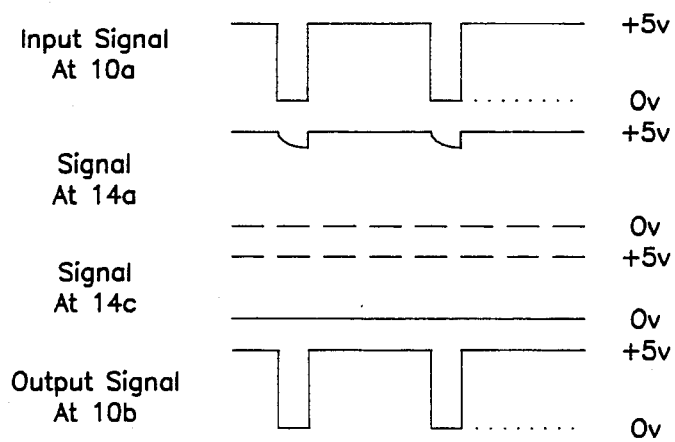

A similar analysis can be carried through with respect to those conditions which exist when switch 18 is oriented in a manner wherein its movable contact 18c is in operative engagement with the 18b stationary contact which is connected to a positive or logical "high" signal. When switch 18 is operative in such mode, the output pulse train signal appearing at the output terminal 10b of network 10 will always assume a "negative logic" state. The two situations which occur for positive logic and negative logic input pulse train signals respectively under such conditions are graphically illustrated in FIGS. 3A and 3B respectively.

From the foregoing description, it will be appreciated that the signal provided to the input terminal 14a of gate 14 represents the average polarity of the received input pulse train signal and that the output signal from gate 14 contains information indicating whether the polarity of the incoming pulse train signal matches or opposes the desired output pulse train signal polarity. The signal output of gate 14 is used to control gate 12. If the control signal indicates correlation between the polarity of the received input pulse train signal and the desired polarity of the output pulse train signal, the received input pulse train signal will be allowed to proceed to the output terminal 10b of the network, basically as received at the input terminal 10a thereof, except for that delay associated with its passing though the gate 12. If, however, the control signal indicates a lack of correlation between the polarity of the received input pulse train signal and the desired polarity for the output pulse train signal, the control signal will cause gate 12 to invert the polarity of the received input pulse train signal before allowing it to proceed to the output terminal 10b. The polarity conversion, however, takes place in real time as the input pulse train signal is being applied to the input terminal 12a of gate 12, such that the output signal appearing at output terminal 10b is identical in phase and timing characteristics to that of the received input pulse train signal applied to input terminal 10a except for the delay associated with gate 12 and the fact that its polarity has been inverted.

It will be appreciated that the principles of this invention apply not only to the circuitry used to implement the invention, but also to the method in general of automatically providing for polarity conversion on a real-time basis, which is responsive to on-line changes in polarity of a received input signal.

While a particular embodiment of the invention has been described with respect to its application for monitoring specific input pulse train signals to a CRT console circuit, it will be understood by those skilled in the art that the invention is not limited to such application or embodiment or to the particular circuits disclosed and described herein. It will be appreciated by those skilled in the art that other circuit configurations that embody the principles of this invention and other applications therefor other than as described herein can be configured within the spirit and intent of this invention. The circuit configuration described herein is provided only as an example of one embodiment that incorporates and practices the principles of this invention. Other modifications and alterations are well within the knowledge of those skilled in the art and are to be included within the broad scope of the appended claims.

What is claimed is:

1. A method of automatically converting a received pulse train signal into an output pulse train signal of desired polarity regardless of the changing polarity characteristics of the input pulse train signal, comprising the steps of:
    (a) receiving an input pulse train signal;
    (b) determining the average polarity of said input pulse train signal and providing a detected output signal responsive thereto;
    (c) establishing a first reference signal representative of the desired polarity of the output pulse train signal comprising switchably selecting at least one of a plurality of available DC voltage levels as said first reference signal;
    (d) forming a control signal responsive to said first reference signal and said detected output signal; and
    (e) conditioning the polarity of said input pulse train signal in response to said control signal to automatically produce therefrom an output pulse train signal of said desired polarity, and having substantially the same timing and phase characteristics as said input pulse train signal.

2. A method of automatically converting a received pulse train signal into an output pulse train signal of desired polarity regardless of the changing polarity characteristics of the input pulse train signal, comprising the steps of:
   (a) receiving an input pulse train signal;
   (b) determining the average polarity of said input pulse train signal and providing a detected output signal responsive thereto;
   (c) establishing a first reference signal representative of the desired polarity of the output pulse train signal;
   (d) forming a control signal responsive to said first reference signal and said detected output signal comprising logically comparing said detected output signal with said first reference signal and producing a logical output control signal in response to said comparison; and
   (e) conditioning the polarity of said input pulse train signal in response to said control signal to automatically produce therefrom an output pulse train signal of said desired polarity, and having substantially the same timing and phase characteristics as said input pulse train signal.

3. The method as recited in claim 2, wherein said comparison output signal assumes a first logical state when said comparison indicates correlation between the polarity of said averaged input pulse train signal and said desired polarity of said output pulse train signal, and assumes a second logical state when said comparison does not indicate correlation between the polarity of said averaged input pulse train signal and said desired polarity of said output pulse train signal.

4. The method as recited in claim 3, wherein the step of conditioning the polarity of said input pulse train signal comprises passing said input pulse train signal to form said output pulse train signal whenever said control signal assumes its said first logical state, and inverting the polarity of said input pulse train signal to form said output pulse train signal therefrom whenever said control signal assumes its said second logical state.

5. An apparatus for automatically converting an input pulse train signal to an output pulse train signal of desired polarity regardless of the changing polarity characteristics of said input pulse train signal, comprising:
   (a) signal averaging means operatively connected to receive said input pulse train signal for creating a detected output signal responsive to the average DC voltage of said input pulse train signal;
   (b) means for establishing a polarity indicator signal representative of the desired polarity of the output pulse train signal;
   (c) means operatively connected to receive said detected output signal and said polarity indicator signal for comparing said detected output signal with said polarity indicator signal and for producing a control signal in response to such comparison; and
   (d) output circuit means operatively connected to receive said input pulse train signal and said control signal for automatically changing the instantaneous value of said input pulse train signal in response to said control signal, thereby causing the output pulse train signal to assume the desired polarity.

6. The apparatus as recited in claim 5, wherein said means for producing said control signal comprises logic circuit means for generating said control signal at a first level when the average DC voltage of said input pulse train signal is of like polarity with said desired polarity, and at a second level when the average DC voltage of said input pulse train signal is of a polarity different from that of said desired polarity.

7. The apparatus as recited in claim 6, wherein said logic circuit means comprises an Exclusive OR gate.

8. The apparatus as recited in claim 6, wherein said output circuit means comprises an Exclusive OR gate.

9. The apparatus as recited in claim 6, wherein said signal averaging means comprises:
   (a) voltage dividing means, operatively connected to receive said input pulse train signal, for providing a signal indicative of said input pulse train signal; and
   (b) a network, including a resistor and a capacitor connected in parallel to one another, operatively connected to said voltage dividing means to receive said signal indicative of said input pulse train signal, said network having an RC time constant greater than the time duration of a single input pulse of said input pulse train signal, whereby said capacitor of said network will not fully charge or discharge during said single input pulse.

* * * * *